(12) United States Patent
Li et al.

(10) Patent No.: US 6,264,258 B1
(45) Date of Patent: Jul. 24, 2001

(54) MODIFIED TRUCK PROTECTOR AGAINST CAR INTRUSION INTO ITS BOTTOM

(76) Inventors: Boliang Li; Bocheng Li, both of Room 5-301, Building 54, Yongle Block, Shijinghshan District, Beijing 100040 (CN)

( * ) Notice: Subject to any disclaimer, the term of this patent is extended or adjusted under 35 U.S.C. 154(b) by 0 days.

(21) Appl. No.: 09/503,683

(22) Filed: Feb. 14, 2000

Related U.S. Application Data

(63) Continuation of application No. PCT/CN99/00165, filed on Oct. 22, 1999.

(30) Foreign Application Priority Data

Sep. 28, 1999 (CN) ................................................ 99248686

(51) Int. Cl.⁷ .................................................... B60R 19/02
(52) U.S. Cl. .......................... 293/102; 293/103; 293/118; 293/131; 293/132; 293/133; 293/135; 293/155
(58) Field of Search .................................... 293/102, 103, 293/118, 131, 132, 133, 135, 155

(56) References Cited

U.S. PATENT DOCUMENTS

| | | | |
|---|---|---|---|
| 3,907,353 | * | 9/1975 | Dinitz .................................. 293/103 |
| 4,247,138 | * | 1/1981 | Child .................................... 293/103 |
| 4,582,351 | * | 4/1986 | Edwards ............................... 293/118 |
| 5,507,546 | * | 4/1996 | Holley .................................. 293/133 |
| 5,520,428 | * | 5/1996 | Bell ...................................... 293/118 |

FOREIGN PATENT DOCUMENTS

| | | | |
|---|---|---|---|
| 1430663 | * | 12/1968 | (DK) ..................................... 293/102 |
| 001743949 A1 | * | 6/1992 | (SU) ...................................... 293/132 |
| 094005527 A1 | * | 3/1994 | (WO) .................................... 293/133 |

* cited by examiner

*Primary Examiner*—Dennis H. Pedder
*Assistant Examiner*—Lori L. Coletta
(74) *Attorney, Agent, or Firm*—Jenkens & Gilchrist

(57) ABSTRACT

This invention relates to a motor vehicle protector against car intrusion into its bottom. It mainly comprises two stationary frames (i.e., steady rests), two pendant arms (i.e., pending arms) and a pipe frame, wherein the upper end of the pendant arms is connected to the rear end of the stationary frame while the pipe frame is connected at the lower and rear side of the two pendant arms. The pipe frame is composed of an upper horizontal annular pipe, a lower horizontal annular pipe, a plurality of upright pipes, and multi-group piling pipes. Additionally, an warning alarm is provided at the rear end of the upper horizontal annular pipe, and a strip front fender is fixed at the internal side of the upright pipe and the lower horizontal annular pipe.

8 Claims, 2 Drawing Sheets

MODIFIED TRUCK PROTECTOR AGAINST CAR INTRUSION INTO ITS BOTTOM

CROSS REFERENCE TO RELATED APPLICATIONS

The application claims priority to Chinese Patent Application Ser. No. 99248686.6, filed on Sep. 28, 1999. This is a continuation application of PCT/CN99/00165, filed Oct. 22, 1999, in which the U.S. was designated.

FIELD OF THE INVENTION

The present invention relates to a motor vehicle protector against car intrusion into its bottom.

BACKGROUND OF THE INVENTION

At present, since most high ways are still provided with mixed traffic lanes for cars and trucks, it often occurs that a car while tailgating may hit the back of a truck and result in a traffic accident. Although some trucks have been provided with a flat fender at their rear to protect against car intrusion, it may not achieve the intended purpose of protection against car intrusion due to the fender's inefficiency in resisting impact. Besides, since the fender is fixed to the lower rear of the truck, if an object on a traffic lane is higher than the fixed fender, the object might collide with the fender or the truck, thus causing damage.

DESCRIPTION OF EMBODIMENTS OF THE INVENTION

Figure 1:
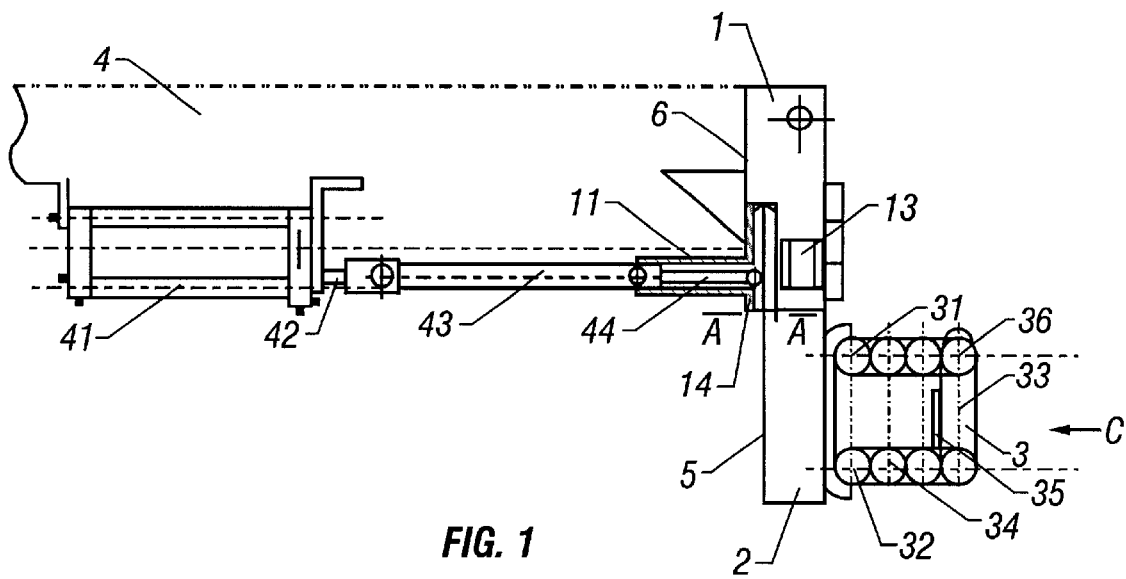
FIG. 1—A cross-sectional view of a schematic illustrating a typical embodiment of this invention.

One object of the invention is to provide a modified truck protector to protect against car intrusion into the truck's bottom. The modified truck protector can absorb impact energy incrementally by a pipe frame. Besides, the pipe frame can be lifted up backward and reset automatically if running into an object on a traffic lane with a height taller than the pipe frame. Preferably, the pipe frame further includes a warning alarm to prevent itself against being trodden on.

This object of this invention is achieved by providing a truck protector for attachment to the rear of a truck. The truck protector in accordance with embodiments of the invention mainly comprises two steady rests (i.e., stationary frame), two pending arms (i.e., pendent arms), and a pipe frame, wherein the upper end of the pending arms are connected to the rear end of the steady rests, and the pipe fame is fixed (or connected) to the lower, rear end of the pending arms (which preferably are parallel to each other). The pipe frame is composed of an upper horizontal annular pipe, a lower horizontal annular pipe, a plurality of upright pipes, and multi-group piling pipes. The upright pipes are located and spaced apart on the rear end of the upper and the lower horizontal annular pipes. The multi-group piling pipes are separately connected between the front and the rear of the upper and the lower horizontal annular pipes. Preferably, a warning alarm which sends a signal if a person steps on the pipe frame is provided at the rear end of the upper horizontal annular pipe. A strip front fender is fixed (or attached) at the internal side of the upright pipe and the lower horizontal annular pipe.

The warning alarm against treading mainly comprises an insulating elastic arc bush and a micro-contact switch. The external edge of the insulating elastic arc bush is a smooth arc surface while the middle portion of the arc surface of its internal edge is provided with two protruding blocks between which the micro-contact switch is located.

An upright rod extends out downward from the bottom of the said steady rests. The front plate of the said pending arms is provided with a spring rolling ball seat opposed to the upright rod.

The front plate of the said pending arms is equipped with a cylinder piston mechanism and a horizontal guide sleeve. The horizontal guide sleeve protrudes forward and is located at the through-hole of the front plate of the said steady rests. This cylinder piston mechanism is mainly composed of a cylinder, a piston, a push rod, and a connecting rod, wherein the rear end of the push rod attached to the exposure end of the piston is pivotally connected to one end of the connecting rod, while the other end is pivotally connected to the pending arms. The push rod is connected to the horizontal guide sleeve by slip matching. The truck protector in accordance with embodiments of the invention may provide one or more of the following advantages: first, it can protect trucks against car intrusion into their bottoms; second, it allows a vehicle to travel on a traffic lane which may have various objects on it; third, the pipe frame with a warning alarm can prevent it from being trodden on. Other advantages and objects of the invention are apparent to those skilled in the art.

EXAMPLE OF PREFERRED EMBODIMENT

The following example merely illustrates a preferred embodiment of the invention and should not be construed as limitative of the invention otherwise described and claimed herein. Nor should it be construed as the only embodiment of the invention.

Figure 2:
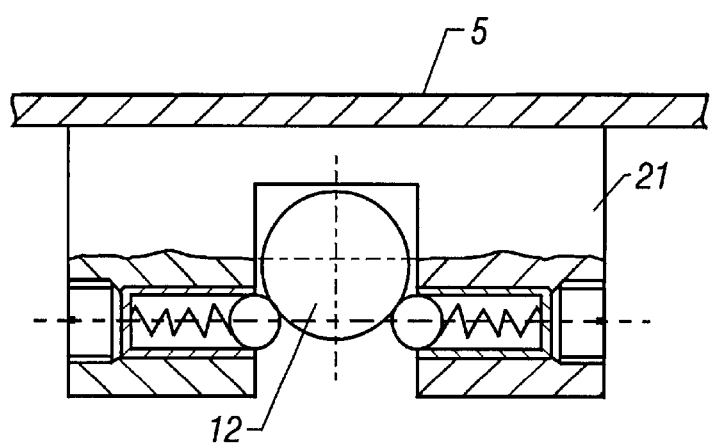
FIG. 2—A cross-sectional view of the embodiment of the invention shown in FIG. 1, taken along the A—A line.
Figure 3:
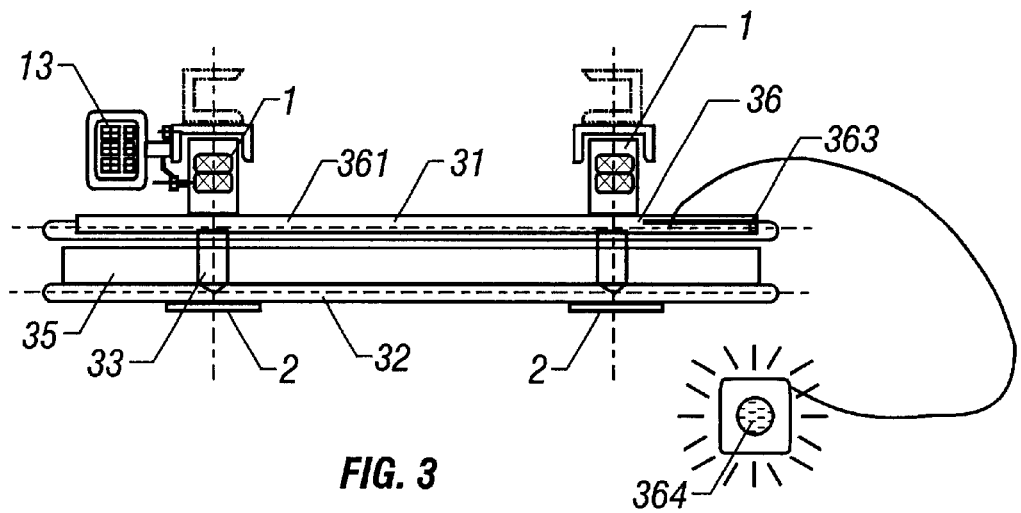
FIG. 3—A side view of the embodiment of the invention of FIG. 1 in the C direction.
Figure 4:
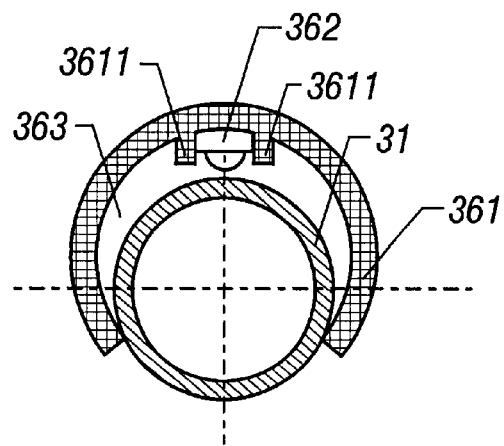
FIG. 4—A cross-sectional view of a warning alarm located on the pipe frame in a typical embodiment of the invention.
Figure 5:
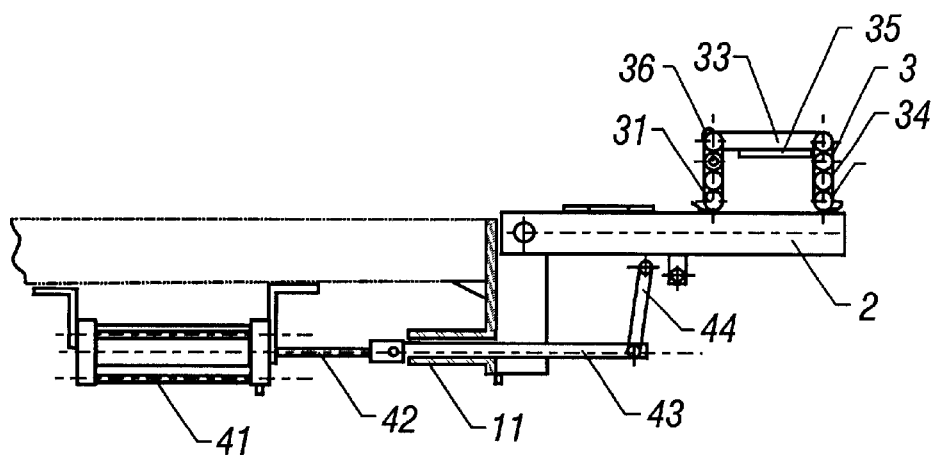
FIG. 5—A schematic illustrating an embodiment of the invention in which the pipe frame is lifted up.

With reference to FIGS. 1–5, a preferred truck protector in accordance with embodiments of the invention comprises two steady rests (1), two pending arms (2), one pipe frame (3) and two cylinder piston mechanisms (4). The two steady rests (1) are fixed (or connected) to the end face of two channel steels of truck chassis, (such as by welding). A horizontal guide sleeve (11) protruding forward is provided at the through-hole (14) of the front plate (6) (left side) of the steady rests (1). An upright rod (12) extends downward from the bottom of its side plate. Besides, an anti-fog light (13) (e.g., MR-W automobile rear fog light) is connected to the external side of the side plate (known in the art), as shown in FIGS. 1, 3, and 5.

Two pending arms (2) are attached to the side plate of steady rests (1) at their top ends while their lower ends are naturally pendent (i.e., unattached). The front plate (5) (left side) of the pending arms (2) is provided with a spring rolling ball seat (21) opposed to the upright rod (12) on the steady rests (1). Both sides of the spring rolling ball seat (21) are separately equipped with rolling ball localizers consisting of springs and rolling balls to restrict the movement of the pending arms (2) when the truck is traveling, as shown in FIG. 2.

The pipe frame (3) (such as steel pipe frame) includes an upper horizontal annular pipe (31), a lower horizontal annular pipe (32), a plurality of upright pipes (33) and multi-groups of piling pipes (34). Referring to FIG. 1, the left side pipe (front end pipe) of the upper horizontal annular pipe (31) and the lower horizontal annular pipe (32) are bolted to the lower section of the two parallel pending arms(2), while the right side pipes (rear end pipes) of the upper and the lower horizontal annular pipes (31)(32) are joined together by a plurality of upright pipes (33) which are spaced apart. Besides, multi-group piling pipes (34) are provided between the left hand side and the right hand side of the upper horizontal annular pipe (31) and the lower horizontal annular pipe (32) at intervals, (e.g., three groups and two layers of piling pipes) as shown in FIGS. 1, 3. When a tailgating car strikes the upper and the lower horizontal annular pipes (31)(32) and the multiple upright pipe (34) of the pipe frame (3), the impact force is absorbed by the multiple group piling pipes (34) when they are crushed sequentially, thus greatly reducing damage by the car. If the impact force of the car is larger, even the pending arms (2) are bent, they can still be stopped by the steady rests (1). Therefore, the car still cannot reach the truck's bottom. When the truck travels on a traffic lane and runs into an object (e.g., a rock or lane with large height differences, etc.), the pipe frame (3) will follow the pending arms (2) to swing backward and be lifted up.

In addition, a strip front fender (35) is provided at the internal side of the upright pipe (33) and the lower horizontal annular pipe (32) of the pipe frame (3) to cover the cavity of the rear end pipe between the upper and the lower horizontal annular pipes (31)(32). This is to protect a person's foot from being extended into the pipe frame (3) as shown in FIG. 1. Besides, the right side pipe (rear side pipe) of the upper horizontal annular pipe (31) is provided with a treading alarm (36) (i.e., a warning alarm), as shown in FIGS. 3 and 4. The treading alarm (36) comprises an insulating elastic arc bush (361), a micro-contact switch (362), two plugs (363) and an alarm case (364). The external edge of the insulating elastic arc bush (361) (e.g. made of polypropylene) is a smooth arc, while the middle portion of its internal arc surface is provided with two protruding blocks (3611), between which a micro-contact switch (362) is located (known in the art). Those two arc edges of the insulating elastic arc bush (361) can grip the upper horizontal annular pipe (31) due to its elasticity. Two ends of this insulating elastic arc bush (361) are separately provided with a plug (363), thus making the micro-contact switch (362) located in a sealed cavity to avoid pollution from external rain and dust. Under this condition, only the wire of the micro contact switch (362) passes through the plug (363) and is connected to an alarm case (364) (known in the art) such as flashing lights (which is located in the driver's cab).

The cylinder piston mechanism (4) mainly comprises an air cylinder (41), a piston (42), a push rod (43), and a connecting rod (44). The air cylinder (41) is attached under an automobile chassis, and the exposure end of the piston (42) is fixed to a push rod (43). One end of the push rod (43) is pivotally connected to the connecting rod (44), while the other end of the connecting rod (44) is pivotally connected to a front plate (5) (left side) of the pending arms (2). The push rod (43) is connected with the horizontal guide sleeve (11) of the steady rests (1) by slip matching. When a truck is in the reverse position (to avoid running into an object) or requires maintenance, an air pump (not shown in figures) inputs air into the air cylinder (41) to make the piston (42) move rightward and the push rod (43) passes through the horizontal guide sleeve (11) and moves rightward, so that the connecting rod (44) swivels the pending arms (2) to a horizontal position. Similarly, the pending arms (2) can also recover its original vertical state under substantially the same operating principle.

While the invention is described with a limited number of embodiments, variations and modifications therefrom exist. The appended claims intend to cover all such variation and modifications as falling within the scope of the invention.

What is claimed is:

1. A truck protector against car intrusion into a bottom thereof, comprising: two steady rests (1), two pending arms (2), and a pipe frame (3), wherein an upper end of the pending arms (2) is connected to a rear end of the steady rests (1), and the pipe frame (3) is attached to a lower, rear side of the two pending arms, and further comprising an upright rod (12) extending downward from a bottom of said steady rests (1), wherein a front plate (5) of said pending arms (2) is equipped with a spring rolling ball seat (21) opposed to the upright rod (12).

2. The truck protector according to claim 1, wherein the pipe frame (3) comprises an upper horizontal annular pipe (31), a lower horizontal annular pipe (32), a plurality of upright pipes (33) and multi-group piling pipes (34), wherein the upright pipes (33) are spaced apart and located on a rear end of the upper and the lower horizontal annular pipes (31)(32), while the multi-group piling pipes (34) are separately connected between a front and the rear end of the upper and the lower horizontal annular pipes (31)(32).

3. The truck protector according to claim 2, wherein a warning alarm (36) is provided at the rear end of the upper horizontal annular pipe (31), and a strip front fender (35) is attached on an internal side of the upright pipes (33) and the lower horizontal annular pipe (32).

4. The truck protector according to claim 3, wherein said warning alarm (36) comprises an insulating elastic arc bush (361) and a micro-contact switch (362), and wherein an external edge of the insulating elastic arc bush (361) is a smooth arc surface while a middle portion of an internal arc edge of the insulating elastic arc bush (361) is provided with two protruding blocks (3611) between which a micro-contact switch (362) is positioned.

5. A truck protector against car intrusion into a bottom thereof, comprising: two steady rests (1), two pending arms (2), and a pipe frame (3), wherein an upper end of the pending arms (2) is connected to a rear end of the steady rests (1), and the pipe frame (3) is attached to a lower, rear side of the two pending arms, and further comprising a cylinder piston mechanism, wherein the cylinder piston mechanism (4) is provided on a front plate (5) of said pending arms (2) while a horizontal guide sleeve (11) protruding forward is provided in a through-hole (14) of a front plate (6) of said steady rests (1), the cylinder piston mechanism (4) is composed of a cylinder (41), a piston (42), a push rod (43), and a connecting rod (44), and a rear end of the push rod (43) which is attached to an exposed end of the piston (42) is pivotally connected to a first end of the connecting rod (44), while a second end of the connecting rod (44) is pivotally connected to the pending arms (2), and the push rod (43) is connected to the horizontal guide sleeve (11) by slip matching.

6. The truck protector according to claim 5, wherein the pipe frame (3) comprises an upper horizontal annular pipe (31), a lower horizontal annular pipe (32), a plurality of upright pipes (33) and multi-group piling pipes (34), wherein the upright pipes (33) are spaced apart and located on a rear end of the upper and the lower horizontal annular pipes (31)(32), while the multi-group piling pipes (34) are separately connected between a front and the rear end of the upper and the lower horizontal annular pipes (31)(32).

7. The truck protector according to claim 6, wherein a warning alarm (36) is provided at the rear end of the upper horizontal annular pipe (31), and a strip front fender (35) is attached on an internal side of the upright pipes (33) and the lower horizontal annular pipe (32).

8. The truck protector according to claim 7, wherein said warning alarm (36) comprises an insulating elastic arc bush (361) and a micro-contact switch (362), and wherein an external edge of the insulating elastic arc bush (361) is a smooth arc surface while a middle portion of an internal arc edge of the insulating elastic arc bush (361) is provided with two protruding blocks (3611) between which a micro-contact switch (362) is positioned.

* * * * *